J. P. WOOD & J. W. SCULL.
AUTOMATIC TUBULAR CAR-COUPLING.
No. 193,679. Patented July 31, 1877.
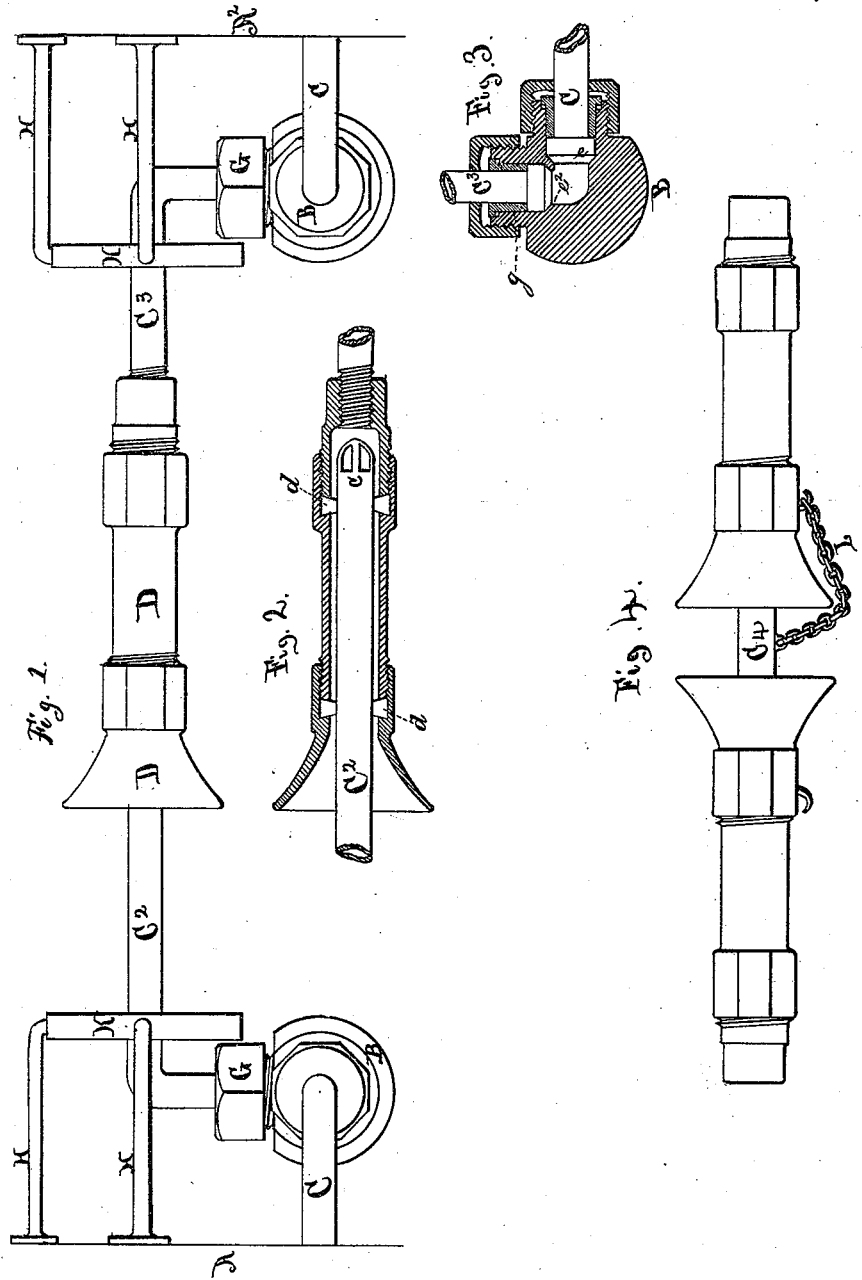
WITNESSES:
Thomas N. Porter
Charles A. Besson Jr.
INVENTORS
James P. Wood
Joseph W. Scull
By F. N. Voorhees
ATTORNEY

UNITED STATES PATENT OFFICE.

JAMES P. WOOD AND JOSEPH W. SCULL, OF PHILADELPHIA, PA., ASSIGNORS OF ONE-THIRD THEIR RIGHT TO HENRY SNYDER, OF SAME PLACE.

IMPROVEMENT IN AUTOMATIC TUBULAR CAR-COUPLINGS.

Specification forming part of Letters Patent No. 193,679, dated July 31, 1877; application filed April 18, 1877.

*To all whom it may concern:*

Be it known that we, JAMES P. WOOD and JOSEPH W. SCULL, both of Philadelphia, in the county of Philadelphia and State of Pennsylvania, have invented certain new and useful Improvements in Automatic Tubular Car-Couplings for Railroad-Cars, which improvements are fully set forth in the following specification and accompanying drawing, making part of the same, in which—

Figure 1 is a side elevation of the coupling, showing its attachment to the end walls of two railroad-cars, when coupled in train. Fig. 2 is a longitudinal vertical section through a part of the coupling, and Fig. 3 a vertical transverse section through the center of one of the ball-joints of the coupling. Fig. 4 shows a modification of Fig. 1.

The object of this invention is to provide a tubular connection between railroad-cars in train, which shall be capable of automatically uniting the cars together when the train is being made up in the ordinary manner, and which shall serve as a conduit for either steam, hot water, hot or cold air, or gas, from one car to another, to and through suitable pipes in each car of the train, for the purpose of either heating, cooling, ventilating, or lighting the entire train from a primary source or reservoir, situated upon or forming a part of the train. If steam be used, it may be supplied either from the locomotive or from a special boiler situated in a baggage-car or in some one car of the train. All necessity for the use of stoves within the cars, so liable to set fire to the train in case of serious injury to the cars, is, by the use of this invention, entirely obviated.

In the accompanying drawing, the lines A $A^2$ represent the respective front and rear walls of two cars when coupled in train. B B are balls, provided with packed joints, hereinafter more particularly described, which balls, through their hollow interiors, form both connecting-conduits for and universal joints with the pipes C C, which pipes are united to or form extensions of circulating-pipes situated within the cars. (The latter pipes are not shown in the drawing.) The balls B B also form similar junctions with the pipes $C^2$ $C^3$. The pipe $C^2$ terminates in a conical caged or barred point, $c$, and the pipe $C^3$ terminates in a bell or trumpet mouth, D, which is preferably formed of a separate piece or pieces, united by screw-threads and a packed joint or joints. The pipe D is made of any desired length and of suitable diameter to form a stuffing-box for or slip-joint with the pipe $C^2$. Packing-rings $d\ d$ are confined at suitable intervals in the interior of the pipe D. As many points for packing-rings, or other desirably-shaped packing, may be provided as the lengths of the several pipes may require, and the pipe D may be divided into as many sections as there are packing-points, which sections, in being screwed together, will compress and always keep tight the several packing-joints. The packing $d$ may consist of either wood, metal, india-rubber, or any other suitable material. The ends of the pipes C $C^2$ $C^3$, within the balls B B, are provided with conical valve-faces $e$, which bear upon conical seats $e^2$, the said faces and seats being respectively turned and bored to fit each other, and ground together, if desired. The joints between the pipes C $C^2$ $C^3$ and the balls B B are packed by means of the sleeves or followers $g$, nuts G, and some suitable interposed packing. By screwing down upon the nuts G the packing between them and the followers $g$ will be compressed, and tight joints be made and kept tight as the faces of the pipes may wear, the balls B B being suitably recessed, as shown in the drawing, for the advance of the followers $g$ as the faces of the pipes C $C^2$ $C^3$ wear away. The nuts G may be locked by jam-nuts, or any equivalent devices.

H K are spring-braces, which span the pipes $C^2$ $C^3$, and whose inner ends are secured to the end walls of the cars. Any suitable pattern or form of brace may be used to best support the pipes of this coupling. In Fig. 4, two bell-mouths are shown, one secured to pipe $C^2$, the other secured to pipe $C^3$. In this case two bell-mouth tubes present themselves opposite each other, as the cars approach when being coupled. In order to unite these bell-mouths a plain piece of pipe, $C^4$, similar to pipe $C^2$, is provided, having a barred point, $c$, at each end. When two cars approach each other, one end of the pipe C⁴ is put into one bell-mouth, when, as the cars come together, the other end of the said pipe will automatically couple with the other bell-mouth. A chain, L, may be used to prevent the accidental loss of the pipe C⁴ when the cars are uncoupled.

The complete operation of this coupling can now be readily understood. As the cars are being run together in the act of making up a train, whenever the conical point of the pipe C² and the trumpet-mouth of the pipe D meet each other anywhere within the circumference of the trumpet-mouth, the two tubes, by virtue of the universal joints formed with the balls B B, will automatically telescope, and thus instantly unite all the conducting-pipes within the cars into one line. Currents of air, water, gas, or steam, can thus pass from one car to another through these couplings, and no leakage ensue thereat.

It is intended that the pipes within the cars, with which pipes these tubular couplings unite, shall meet the end walls of all cars at a certain determinate height above the level of the rails of the track, which predetermined elevation will bring the couplings at a convenient height above the doors of the cars in the center of the width of each car, and will necessarily prevent any failure of automatic union between the opposite parts of a coupling when moved into forced contact with each other. Expansion-joints will unite these couplings to the pipes within the cars, and the construction of the ball-joints is such that all motions of the cars, either vertical or horizontal, or at any angle intermediate between the vertical and horizontal, will be fully compensated for without strain upon, or rupture of, the said joints.

All tubular connections between railroad-cars heretofore made for similar purposes, have been either rigid or flexible, or half-rigid and half-flexible, and have been placed at or near the platforms of the cars.

The device or combination of devices constituting this invention forms neither a rigid nor a flexible coupling, but a self-adjusting, self-packing, automatic tubular coupling, which telescopically unites itself, and thus forms a continuous line of pipe within and between any number of cars in train, near the top of the end wall of each car.

The pipe or pipes within the cars connecting with this coupling may pass the whole length of each car, overhead or otherwise, as preferred, the said pipes being provided with lateral branches connected to pipes in the lower part of the car, as desired, where suitable steam-traps and air-valves may be connected.

One great and important advantage of the principal distinguishing feature of this invention—viz., the coupling of the cars near their tops instead of at their platforms—is, that less surface of pipe is exposed to the refrigerating influences of the atmosphere, all turns or bends where water of condensation may accumulate being avoided.

In addition to the above-mentioned serious objection of condensation, which cannot be avoided by coupling near the platforms, the modern improved car-couplings and brake-gear there placed really leave no room thereat for attachments designed to serve the purpose of this invention without endangering, or entirely preventing, their successful operation.

It is obvious that the ball-joints herein described may be used for some purposes with solid rods, in place of pipes or tubes.

The coupling constituting this invention may be constructed of any suitable metal or material, and may be clothed or lagged with any suitable non-heat-conducting material.

Having thus fully described this automatic tubular car-coupling as of our invention, we claim—

1. A coupling ball-joint consisting of a ball, B, provided with interior conical seats, in combination with conical-faced pipes or rods joined thereto, substantially as specified.

2. A tubular coupling for connecting railroad-cars in train, provided with a conical barred point, c, and a trumpet-mouthed tube, D, substantially as specified.

3. An automatic telescope-coupling connecting railroad-cars in train, in combination with conducting-pipes situated within said cars and connected to said coupling at or near the tops of the end walls of the cars, substantially as specified.

JAMES P. WOOD.
JOS. W. SCULL.

Witnesses:
THOMAS A. PORTER,
CHARLES A. BESSON, Jr.